(No Model.)
S. R. BYRD.
COTTON SEED DISTRIBUTER.
No. 341,994. Patented May 18, 1886.
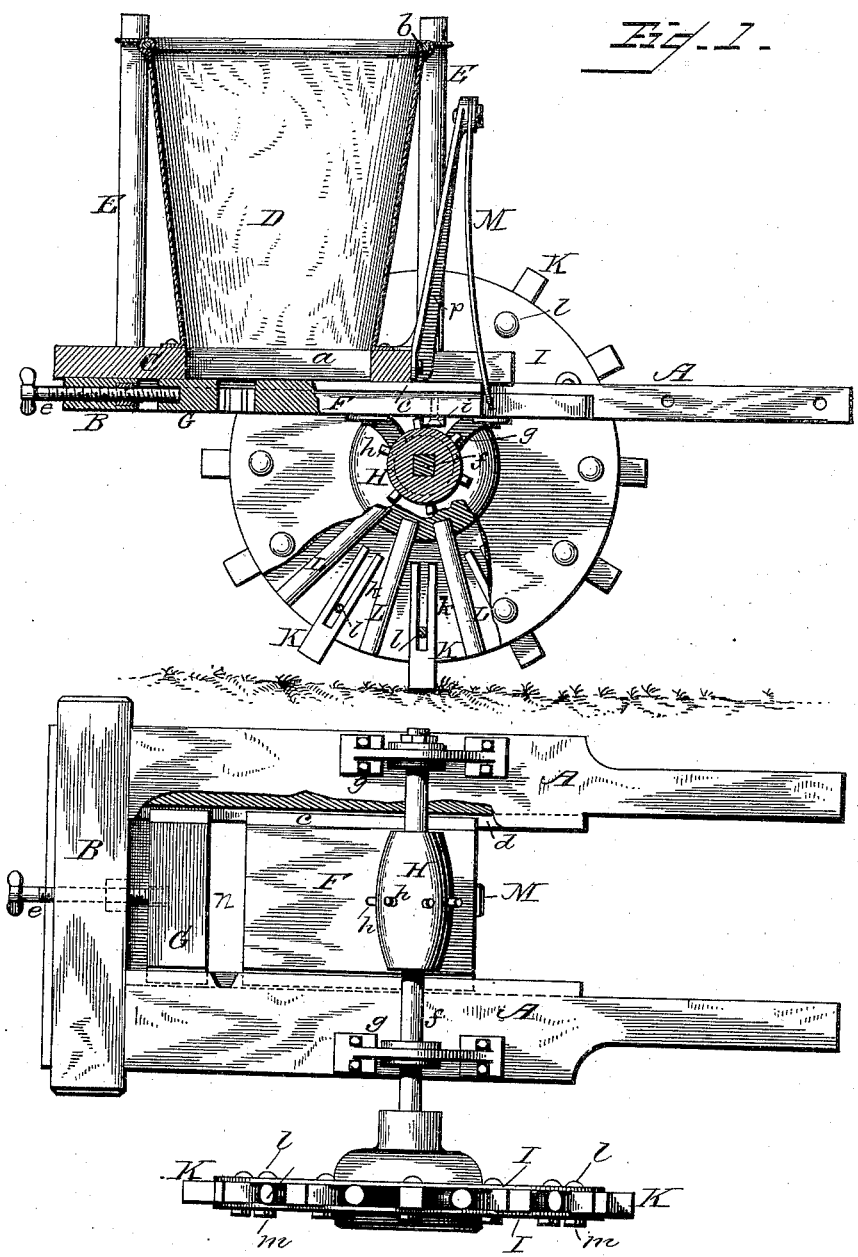
Witnesses
Inventor
Samuel R. Byrd
By his Attorney Chas. H. Fowler

UNITED STATES PATENT OFFICE.

SAMUEL R. BYRD, OF BLUFF CREEK, MISSISSIPPI.

COTTON-SEED DISTRIBUTER.

SPECIFICATION forming part of Letters Patent No. 341,994, dated May 18, 1886.

Application filed January 12, 1886. Serial No. 188,371. (No model.)

*To all whom it may concern:*

Be it known that I, SAMUEL R. BYRD, a citizen of the United States, residing at Bluff Creek, in the county of Jackson and State of Mississippi, have invented certain new and useful Improvements in Fertilizer-Distributers; and I do hereby declare that the following is a full, clear, and exact description of the same, reference being had to the accompanying drawings, in which—

Figure 1 represents a side elevation thereof, partly in section; and Fig. 2 an under side plan view.

The present invention has for its object to provide an agricultural machine whereby the distribution of cotton-seed meal, and fine fertilizers is greatly facilitated in dropping it in the drill as the plow opens the furrow, and in such quantities and distance apart as may be desired, which objects I attain by the construction substantially as shown in the drawings, and hereinafter described and claimed.

In the accompanying drawings, the frame of the machine consists of the two parallel and horizontal beams, A, connected at their rear ends by cross-beam B. Upon the upper side of the beams A is supported a platform, C, provided with an opening, $a$, around which is secured the lower end of a flexible hopper, D, preferably of canvas or other like material. This hopper at its upper end is secured to a circular band or hoop, $b$, of metal or other desirable material, and said hoop is attached, in any well-known manner, to posts E. Under the opening $a$ is located a sliding feeder, F, which has tongues $c$ at its edges, working in grooves $d$ to guide it in its vibratory movement, the extent of motion of the feeder being regulated by the follower G and thumb-screw $e$, said screw extending through the cross-beam B and engaging with screw-threads therein. A shaft or axle, $f$, has its bearings in suitable boxes, $g$, attached to the under side of the beams A, and is provided with a hub, H, which has teeth $h$ projecting radially therefrom to engage or be brought against in succession a lug, $i$, depending from the under side of the feeder F.

To insure the proper rotation of the shaft $f$, I attach at one end thereof a wheel consisting of the two flat clamping-disks, I, between which are held rimless spokes K. These spokes have their inner ends bifurcated, as shown at $k$, and between the arms of the bifurcations extend bolts $l$, headed at one end and screw-threaded at the other to receive screw-nuts $m$. The bolts $l$ pass through perforations in the disks I, and by screwing up the nuts $m$ the disks are brought tightly against the spokes K, to hold them in their adjusted position, and to extend or shorten them with relation to the rim of the wheel, the disks being loosened by unscrewing the nuts. It is evident that in place of the bifurcations slots may be formed in the spokes, which would accomplish the same purpose, except that they could not be detached without removing the bolts. Between the disks of the wheel are located radial braces L, the inner ends being attached to the hub, thus giving strength to the wheel between each spoke and increasing its durability.

The machine herein described is adapted for attachment to a plow, and as the plow advances the spokes K, coming in contact with the ground, will be caused to revolve, and with it the shaft or axle $f$, to which it is attached, bringing in succession the pins $h$ against the lug $i$. This will bring forward the sliding feeder F, leaving an opening, $n$, through which the seed or fertilizer is discharged, this opening being regulated by the follower G. As the pin passes the lug, a spring, M, forces the feeder back to close the discharge-opening, said spring at its upper end being attached to a standard, $p$, and its lower or free end bearing against the edge of the feeder. The quantity of seed or fertilizer to be discharged, as previously stated, is regulated by the follower and thumb-screw, and the distance between each discharge is governed by the adjustment of the bifurcated spokes, lengthening or shortening them, as the case may be.

Having now fully described my invention, what I claim as new, and desire to secure by Letters Patent, is—

1. In a seeder or fertilizer-distributer, a suitable frame provided with a hopper and feeding device, and a rotary shaft with means for operating the feeder, in combination with a wheel upon the end of the shaft, and consisting of two clamping-disks and rimless spokes adjustably held between them, and radial braces connected to the hub of the wheel between the disks and spokes, and extending to the periphery of said disks, substantially as and for the purpose set forth.

2. A seeder or fertilizer-distributer consisting of a flexible hopper, a suitable frame carrying a sliding feeder, means for regulating the discharge-opening thereof, a spring bearing against the end of the feeder, and a revolving shaft provided with teeth acting in conjunction with a lug on said feeder, and a wheel connected to one end of the shaft and consisting of two clamping-disks provided with adjustable rimless spokes, substantially as and for the purpose set forth.

SAMUEL R. BYRD.

Witnesses:
JAMES B. McRAE,
JOHN McMILLAN.